J. OBERMIRE & D. KROUS.
VALVE.
APPLICATION FILED NOV. 29, 1913.
1,098,963.
Patented June 2, 1914.
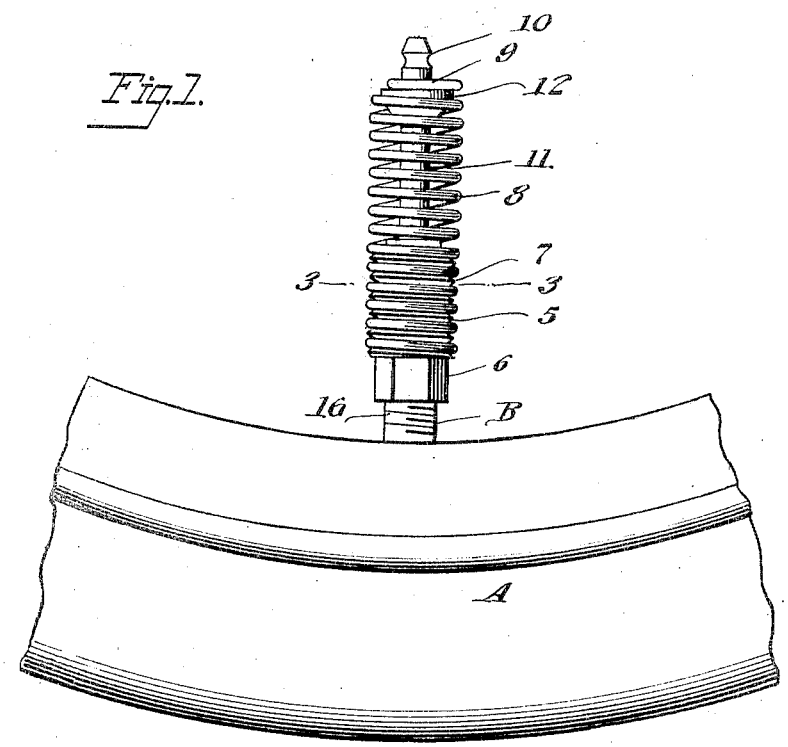
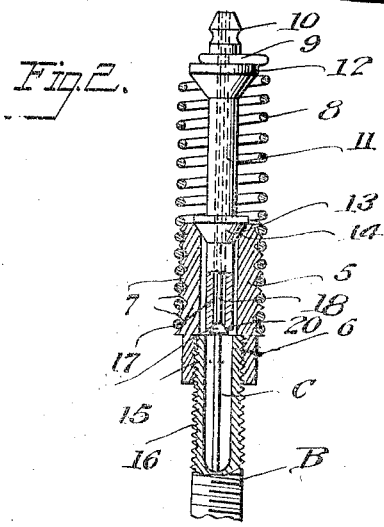
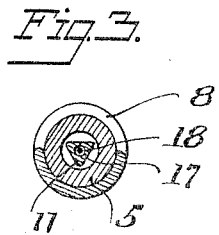
Witnesses
Inventors
Joseph Obermire
Daniel Krous
By Victor J. Evans
Attorney

UNITED STATES PATENT OFFICE.

JOSEPH OBERMIRE AND DANIEL KROUS, OF CATALPA, NEBRASKA.

VALVE.

1,098,963.   Specification of Letters Patent.   Patented June 2, 1914.

Application filed November 29, 1913. Serial No. 803,786.

*To all whom it may concern:*

Be it known that we, JOSEPH OBERMIRE and DANIEL KROUS, citizens of the United States, residing at Catalpa, in the county of Holt and State of Nebraska, have invented new and useful Improvements in Valves, of which the following is a specification.

The invention relates to tire valve attachments, and more particularly to the class of pressure regulators for pneumatic tires.

The primary object of the invention is the provision of a regulator wherein any excessive air pressure within a tire will be automatically relieved when expanded by heat or otherwise, thereby relieving the interior strain and preventing the bursting or tearing of the tire.

Another object of the invention is the provision of a regulator wherein the construction thereof is of novel form so that it can be readily and easily attached to any valve stem of an automobile, bicycle, motorcycle or the like vehicle tire of the pneumatic type, the air pressure in the latter being maintained at a predetermined pounds pressure, and which will obviate the bursting of the same as excessive air pressure will be automatically relieved therefrom.

A further object of the invention is the provision of a regulator of this character which is simple in construction, reliable and efficient in operation, and inexpensive in manufacture.

With these and other objects in view, the invention consists in the construction, combination and arrangement of parts as will be hereinafter fully described, illustrated in the accompanying drawing, and pointed out in the claim hereunto appended.

In the drawing:—Figure 1 is a fragmentary side view of a tire showing the regulator constructed in accordance with the invention. Fig. 2 is a vertical longitudinal sectional view of the same. Fig. 3 is a sectional view on the line 3—3 of Fig. 1.

Similar reference characters indicate corresponding parts throughout the several views in the drawing.

Referring to the drawing in detail, A designates a portion of a pneumatic tire having the usual inner tube from which projects the valve stem B, and C the usual relief pin therein. On this valve stem B is attached the regulator presently described.

The regulator comprises a sleeve 5 formed at one end with external wrench engaging surfaces 6, while the remaining external portion of the sleeve is provided with screw threads 7 with which is detachably engaged a coiled retractile spring 8, which is formed with an outer eye terminal 9 encircling the outer nipple end 10 of a valve plunger 11 which is located centrally within the spring 8, the eye terminal 9 being designed to rest against an annular shoulder 12 formed on the plunger 11, which is also formed spaced from the said shoulder with a beveled valve 13, the latter normally engaging a correspondingly beveled valve seat 14 formed in the outer end of the sleeve 5, which has in its opposite end internal screw threads 15 adapted for detachable engagement with the external screw threads 16 on the valve stem B for the mounting of the sleeve 5 thereon.

The plunger 11 is formed with a central bore 17 in which is fitted a valve rod 18 which is formed at one end with a valve head 19 adapted to rest in a valve seat 20 formed in the inner end of the plunger 11, and also adapted to contact with the relief pin C in the valve stem B so as to open the said stem when the regulator is mounted thereon, whereby on the attaching of the hose of a pump to the nipple 10 air may be forced into the inner tube of the tire A for the filling of the same. When excessive pounds pressure of air is admitted to the inner tube of the tire A the valve 13 will automatically unseat from its seat 14 against the resistance of the spring 8 so that the said excessive air pressure will be relieved therefrom, thereby obviating the bursting or tearing of the tire, and thus relieving interior strain.

It will be noted that the regulator will sustain a predetermined pounds pressure within the tire and will automatically relieve air therefrom when expanded by heat or other causes. The tire can be inflated in the usual manner without detaching the regulator.

From the foregoing it is thought that the construction and manner of operation of the device will be clearly understood, and therefore a more extended explanation has been omitted.

What is claimed is:—

A regulator for a pneumatic valve stem comprising a sleeve having an internal thread for detachable connection with the stem and also provided with an external thread, a coiled retractile spring detachably engaging the external thread on the sleeve and formed with an eye at its outer free end, a centrally bored plunger having a nipple end passed through the eye of the spring, while its opposite end works within the sleeve, an external valve formed on the plunger for closing the outer end of the sleeve under the action of the spring, and a valve rod located within the plunger for normally closing the bore therein and adapted to open the relief pin in the valve stem.

In testimony whereof we affix our signatures in presence of two witnesses.

JOSEPH OBERMIRE.
DANIEL KROUS.

Witnesses:
LIZZIE DONOHOE,
J. A. DONOHOE.